United States Patent [19]
Whorlow

[11] Patent Number: 5,140,209
[45] Date of Patent: Aug. 18, 1992

[54] METHOD OF CONTROLLING ELECTROMAGNETS IN ELECTROMAGENTIC BEARINGS

[75] Inventor: Raymond J. Whorlow, Brighton, England

[73] Assignee: The Glacier Metal Company Limited, England

[21] Appl. No.: 469,538

[22] PCT Filed: Jul. 17, 1989

[86] PCT No.: PCT/GB89/00824
§ 371 Date: Mar. 19, 1990
§ 102(e) Date: Mar. 19, 1990

[87] PCT Pub. No.: WO90/01122
PCT Pub. Date: Feb. 8, 1990

[30] Foreign Application Priority Data
Jul. 19, 1988 [GB] United Kingdom ............... 8817153

[51] Int. Cl.[5] .............. H02K 5/24; F16L 39/06; G05B 11/32
[52] U.S. Cl. ..................... 310/90.5; 318/649
[58] Field of Search ............. 310/90.5, 51; 318/128, 318/629, 632, 649

[56] References Cited

U.S. PATENT DOCUMENTS

| | | | |
|---|---|---|---|
| 3,215,901 | 11/1965 | Carniol | 317/123 |
| 4,090,745 | 5/1978 | Dohogne et al. | 310/90.5 |
| 4,379,598 | 4/1983 | Goldowsky | 310/90.5 |
| 4,999,534 | 3/1991 | Andrianos | 310/90.5 |

Primary Examiner—R. Skudy
Assistant Examiner—D. L. Rebsch
Attorney, Agent, or Firm—Nixon & Vanderhye

[57] ABSTRACT

A method of controlling the electromagnets of a magnetic bearing comprises the steps of (1) deriving from a first sensor a first signal representative of the absolute position of a shaft supported in the bearing, (2) limiting the first signal to a first control range which defines a range of shaft displacement, from any desired position smaller than the full range of possible displacements within which the restoring force is related to the displacement sensed, (3) deriving a second signal substantially independent of the first signal and also representative of the absolute position, (4) processing the second signal to derive therefrom a third signal representing the rate of change of the absolute position over the full range of possible shaft displacements, (5) combining the first and third signals to produce a control signal, and (6) applying the control signal to control the electromagnets so as to restore the shaft to the desired position in the bearing.

4 Claims, 1 Drawing Sheet

METHOD OF CONTROLLING ELECTROMAGNETS IN ELECTROMAGENTIC BEARINGS

This invention relates to magnetic bearings. It is known to use electromagnets to support a rotatable shaft without mechanical contact. It is also known to determine the position of the shaft relative to the supporting magnets and to use this determination to apply a correction for any unwanted displacement from a selected position.

However, absolute position of the shaft relative to the magnets is only one part of the problem, since it is generally insufficient to merely apply a restoring force proportional to the magnitude of the displacement. To illustrate this, it is possible to achieve bearing "stiffness" by applying large restoring forces in response to very small displacements, but this is at the expense of also achieving vulnerability to over-shoot, beyond the target or zero displacement attitude. Stiffness may thus be accompanied by unacceptable instability.

In an attempt to overcome this problem of instability it has been proposed that the determination of absolute position should be further processed to generate an indication of the rate of change of position and that this latter indication should be combined with the absolute position, the resultant combined indication being used to generate a restoring force whose magnitude/direction not only reflects absolute position but also rate of change of position. The latter introduces damping to the system, to counteract the stiffness developed in response to small changes of absolute position alone.

For example, a Hall-effect sensor may be employed to generate an electrical signal directly representative of position. This signal may then be differentiated to generate a second electrical signal, which is representative of the rate of change of absolute position. By applying these two signals, amplified as necessary, to a summing amplifier, a combined control signal for use in controlling the electromagnets of a magnetic bearing system can be developed. As stated above, the arrangement just described adds damping to counterbalance stiffness which has been achieved by correcting only for departures from absolute position. In practice however, the range of displacement over which both controlled stiffness and damping are achieved becomes too narrow. It will be appreciated that for satisfactory operation, damping must be effective throughout the full range of absolute displacement, since outside constraints may prevent the latter from being held indefinitely within the narrow range over which stiffness can be achieved.

It is an object of the present invention to overcome, or at least mitigate the aforementioned difficulty.

According to the present invention a method of controlling the electromagnets of a magnetic bearing comprises the steps of (1) deriving from a first sensor a first signal representative of the absolute position of a shaft supported in said bearing, (2) limiting said first signal to a first control range, (3) deriving a second signal substantially independent of the first signal and also representative of said absolute position, (4) processing said second signal to derive therefrom a third signal representing the rate of change of said absolute position over a second control range, (5) combining said first and third signals to produce a control signal, and (6) applying said control signal to control said electromagnets so as to restore the shaft to a desired position in said bearing.

The first control range is preferably limited to correspond to a small range of displacement from the desired position, such that the full magnetic restoring force is developed in response to said small displacement. The second control range is preferably selected to correspond to the full range of possible displacement. It will be seen that the arrangement provides maximum restoring force (in response to the limited first signal) over a small displacement range, thereby conferring maximal stiffness on the system. Using conventional techniques, the third signal would also be effective over the same range, thereby restricting the damping effect to that narrow range. But by limiting only the first signal, damping can also be achieved outside the maximum stiffness range and accordingly it is now possible to achieve both high stiffness and stability.

According to a further aspect of the invention, control apparatus for an electromagnetic bearing comprises the combination of first sensor means operable to generate a first signal representative of the absolute position of a shaft supported in said bearing, means for limiting said first signal to a first control range, second sensor means for generating a second signal substantially independant of the first signal and also representative of said absolute position, means for processing said second signal to generate therefrom a third signal representing the rate of change of said absolute position over a second control range, together with means for combining said first and third signals to produce a control signal which is thereafter applied to magnet driver means to restore said shaft to a desired position in said bearing.

While separate sensors may be used to generate the first and second signals, it is possible to use the same sensor to generate both signals. However, in such case, the initial single signal must be split into separate channels for processing into the first and third control signals respectively, so that the first signal can be limited without significant effect on the third signal.

Figure 1:
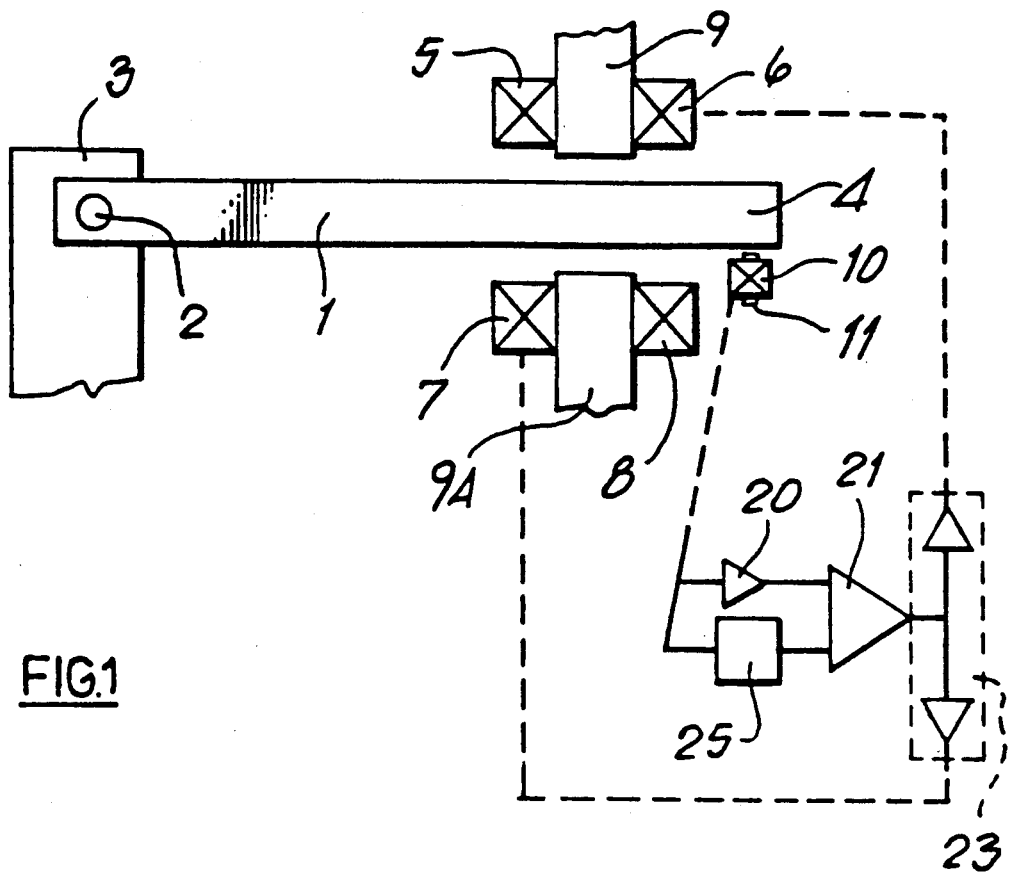
FIG. 1 shows one embodyment of the invention.

In order that the invention be better understood, a simplified embodiment of it will now be described by way of example with reference to the accompanying drawings. In both drawings, a cantilever beam 1 pivoted at one end 2 to a fixed support 3 is disposed with its free end 4 disposed between opposed electromagnets 5, 6 and 7, 8 respectively. Note that in FIG. 1, the latter are in the form of a single coil around a pole piece 9, part only of which is shown. In FIG. 2, U shaped pole pieces are used, each leg of the U having a coil thereon.

The electromagnets are in both instances rigidly attached to the support 3, by means not shown. The arrangement is shown in the active state, i.e. with the electromagnets energized.

Figure 2:
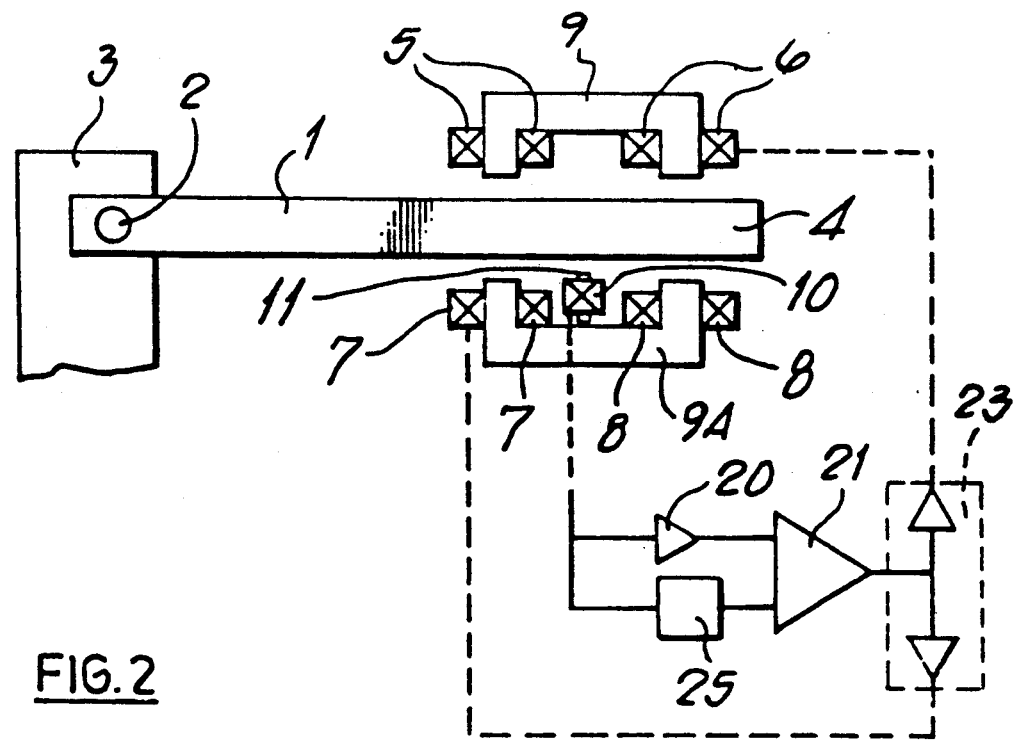
FIG. 2 shows a second embodyment of the invention.

A single sensor comprising a coil wound on a magnetic core 11 is located outside the magnetic field in FIG. 1. In FIG. 2 it is between the electromagnets 7,8. The cantilever 1 is in this instance made of iron, though other materials may also be used provided that they contain or carry a magnetically responsive medium. In use, the coil 10 provides an output signal 12 corresponding to the relative displacement of the cantilever from the desired position shown in the Figure.

This signal is split into two paths, the first of which passes through a limiting amplifier 20 to a summing amplifier 21, the output of which is connected to a conventional power amplifier system 23 for supplying the electromagnets. The second path includes signal processing 25 (in this example, differentiation) to generate the third signal referred to earlier. This may be amplified as necessary, before feeding it to the same summing amplifier 21.

Because the absolute displacement of the cantilever and the rate at which displacement takes place have been separated into two separate paths, the former can operate over a very narrow range of displacement (thereby achieving maximal stiffness for the system) while the rate of change of position signal operates over a wider range of displacement. Damping is thus achieved outside the narrow range of control attributable to the absolute position signal alone.

I claim:

1. A method of controlling the electromagnets of a magnetic bearing to apply a restoring force to a shaft in response to a displacement of the shaft comprising the steps of (1) deriving from at least one sensor first and second signals representative of an absolute position of a shaft supported in said bearing, (2) limiting said first signal to a first control range which defines a range of shaft displacement, from any desired position smaller than a full range of possible displacements within which the restoring force is related to the displacement sensed, (3) processing said second signal to derive therefrom a third signal representing the rate of change of said absolute position over the full range of possible shaft displacements, (4) combining said first and third signals to produce a control signal, and (5) applying said control signal to control said electromagnets so as to restore the shaft to said desired position in said bearing.

2. A method according to claim 1 wherein a single sensor is used to generate both the first and second signals, the method including the further step of splitting an initial signal from said sensor into two separate signals for processing into the first and third signals respectively.

3. Control apparatus for an electromagnetic bearing including a shaft and electromagnet driver means responsive to a control signal to apply an electromagnetic restoring force to said shaft, the control apparatus comprising sensor means operable to generate first and second signals representative of an absolute position of a shaft supported in said bearing, means for limiting said first signal to a first control range defining a range of shaft displacement, from any desired position, smaller than a full range of possible displacements within which the restoring force is related to the displacement sensed, means for processing said second signal to generate therefrom a third signal representing the rate of change of said absolute position over the full range of possible shaft displacements and means for combining said first and third signals to produce a control signal which is thereafter applied to said electromagnetic drive means to restore said shaft to said desired position in said bearing.

4. Apparatus according to claim 3, wherein the first and second sensor means are constituted by a single sensor device, and that signal splitter means operable to split the signal from the sensor device into two, separately-processable signals are provided.

* * * * *